(12) United States Patent
Serebrin et al.

(10) Patent No.: US 9,594,704 B1
(45) Date of Patent: Mar. 14, 2017

(54) USER MODE INTERRUPTS

(71) Applicant: Google Inc., Mountain View, CA (US)

(72) Inventors: Benjamin C. Serebrin, Sunnyvale, CA (US); Michael R. Marty, Madison, WI (US); Paul Jack Turner, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 495 days.

(21) Appl. No.: 14/109,877

(22) Filed: Dec. 17, 2013

(51) Int. Cl.
*G06F 13/24* (2006.01)
*G06F 9/48* (2006.01)
*G06F 9/32* (2006.01)

(52) U.S. Cl.
CPC ............ *G06F 13/24* (2013.01); *G06F 9/4812* (2013.01); *G06F 9/327* (2013.01)

(58) Field of Classification Search
CPC ......... G06F 13/24; G06F 9/4812; G06F 9/327
See application file for complete search history.

(56) References Cited

U.S. PATENT DOCUMENTS

| | | |
|---|---|---|
| 4,768,149 A | 8/1988 | Konopik et al. |
| 5,287,523 A | 2/1994 | Allison et al. |
| 5,381,552 A | 1/1995 | Dahlberg et al. |
| 5,388,263 A | 2/1995 | Ellis |
| 5,596,755 A | 1/1997 | Pletcher et al. |
| 5,854,913 A | 12/1998 | Goetz et al. |
| 5,909,582 A | 6/1999 | Nakata |
| 6,167,425 A | 12/2000 | Beckhoff |
| 6,378,023 B1 | 4/2002 | Christie et al. |
| 7,707,341 B1* | 4/2010 | Klaiber ............... G06F 9/45533 710/244 |
| 7,870,541 B1 | 1/2011 | Deshpande |
| 2002/0019902 A1 | 2/2002 | Christie |
| 2004/0153906 A1 | 8/2004 | Kusumoto et al. |
| 2005/0149711 A1 | 7/2005 | Zimmer et al. |
| 2005/0154813 A1 | 7/2005 | DeWitt et al. |

(Continued)

OTHER PUBLICATIONS

"Changing from Kernel mode to User mode (and vice versa)," StackExchange, Apr. 11, 2013 [retrieved Oct. 27, 2015]. Retrieved from the Internet: URL<http://cs.stackexchange.com/questions/11230/changing-from-kernel-mode-to-user-mode-and-vice-versa/2#2>, 2 pages.

(Continued)

*Primary Examiner* — Ernest Unelus
(74) *Attorney, Agent, or Firm* — Fish & Richardson P.C.

(57) ABSTRACT

A method includes for each processed interrupt: identifying an interrupt associated with a first interrupt number; determining that the interrupt is designated as a special interrupt, the special interrupt being an interrupt to be translated to a different interrupt number only if the hardware processor is in user mode; determining a current execution mode for the hardware processor; for each interrupt in operating system mode, delivering the interrupt as the first interrupt number; and for each interrupt in user mode: translating the first interrupt number to a second interrupt number; and delivering the interrupt as the second interrupt number, wherein the current execution mode is determined to be an operating system mode for at least one of the interrupts, and the current execution mode is determined to be a user mode for at least an additional one of the interrupts.

20 Claims, 4 Drawing Sheets

(56) References Cited

U.S. PATENT DOCUMENTS

| 2007/0136403 | A1 | 6/2007 | Kasuya |
| 2009/0259846 | A1 | 10/2009 | Watt |
| 2010/0293342 | A1 | 11/2010 | Morfey et al. |
| 2011/0040915 | A1 | 2/2011 | Strauss et al. |
| 2012/0036341 | A1 | 2/2012 | Morfey et al. |

OTHER PUBLICATIONS

Corbet, "Handling interrupts in user space," LWN.net, Mar. 15, 2005 [retrieved on Oct. 27, 2015]. Retrieved from the Internet: URL<https://lwn.net/Articles/127698/>, 4 pages.

Yang, "W4118 Operating Systems," Columbia University, Course Powepoint, Spring 2009, 18 pages.

\* cited by examiner

USER MODE INTERRUPTS

BACKGROUND

This specification relates to techniques for providing user mode interrupts from a processor.

Modern processors may include multiple independent processor cores. Each processor core may execute one or more threads at a time. The processor core may be configured to process interrupts from various resources and deliver the interrupts to the currently executing threads. When an interrupt is received from a resource, the processor core may inject the interrupt into the currently executing thread by calling a function that has been configured to receive the interrupt within the code executing in the thread. Execution of the thread will thus be interrupted so that the function can be called to process the interrupt.

SUMMARY

The subject matter of this application relates to techniques for providing user mode interrupts from a processor.

In general, one innovative aspect of the subject matter described in this specification can be embodied in methods that include the actions of processing interrupts, and for each interrupt: identifying an interrupt associated with a first interrupt number; determining that the interrupt is designated as a special interrupt, the special interrupt being an interrupt to be translated to a different interrupt number only if the hardware processor is in user mode; determining a current execution mode for the hardware processor; for each interrupt for which the current execution mode is determined to be an operating system mode, delivering the interrupt as the first interrupt number; and for each interrupt for which the current execution mode is determined to be a user mode: translating the first interrupt number to a second interrupt number; and delivering the interrupt as the second interrupt number, wherein the current execution mode is determined to be an operating system mode for at least one of the interrupts, and the current execution mode is determined to be a user mode for at least an additional one of the interrupts.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By sending interrupts directly to user mode programs for processing, increased performance may be realized versus previous techniques. Further, the present techniques avoid giving operating system level privileges to user mode programs during interrupt processing.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In modern computer systems, latency-sensitive operations may be handled by both operating system programs and user programs. For example, a user program may require direct notification when low latency device resources (e.g., Network Interface Cards (NICs), flash storage, etc.) signal the completion of a request. Such direct notification may be necessary to quickly react to the completion and thus fully take advantage of such high-speed device resources. Current techniques partially allow for user programs to receive interrupts, but require that the interrupts be mediated by the operating system, which leads to poor performance. Further, a solution built with current hardware may require user program to be given too much privilege to be able to provide proper isolation, and may contain destructive race conditions.

Accordingly, the present disclosure describes various implementations for allowing user programs (e.g., user mode code) to receive and process interrupts. In one example, a method includes for each interrupt received by a processor, associating the interrupt with a first interrupt number. A determination is then made that the interrupt is designated as a special interrupt, such as, for example, by consulting a special interrupt register. A current execution mode for the processor is then determined. For each interrupt for which the current execution mode is determined to be an operating system mode, the interrupt is delivered (e.g., to the operating system) as the first interrupt number. For each interrupt for which the current execution mode is determined to be a user mode, the first interrupt number is translated to a second interrupt number, and the interrupt is delivered (e.g., to the currently running user program) as the second interrupt number.

Figure 1:
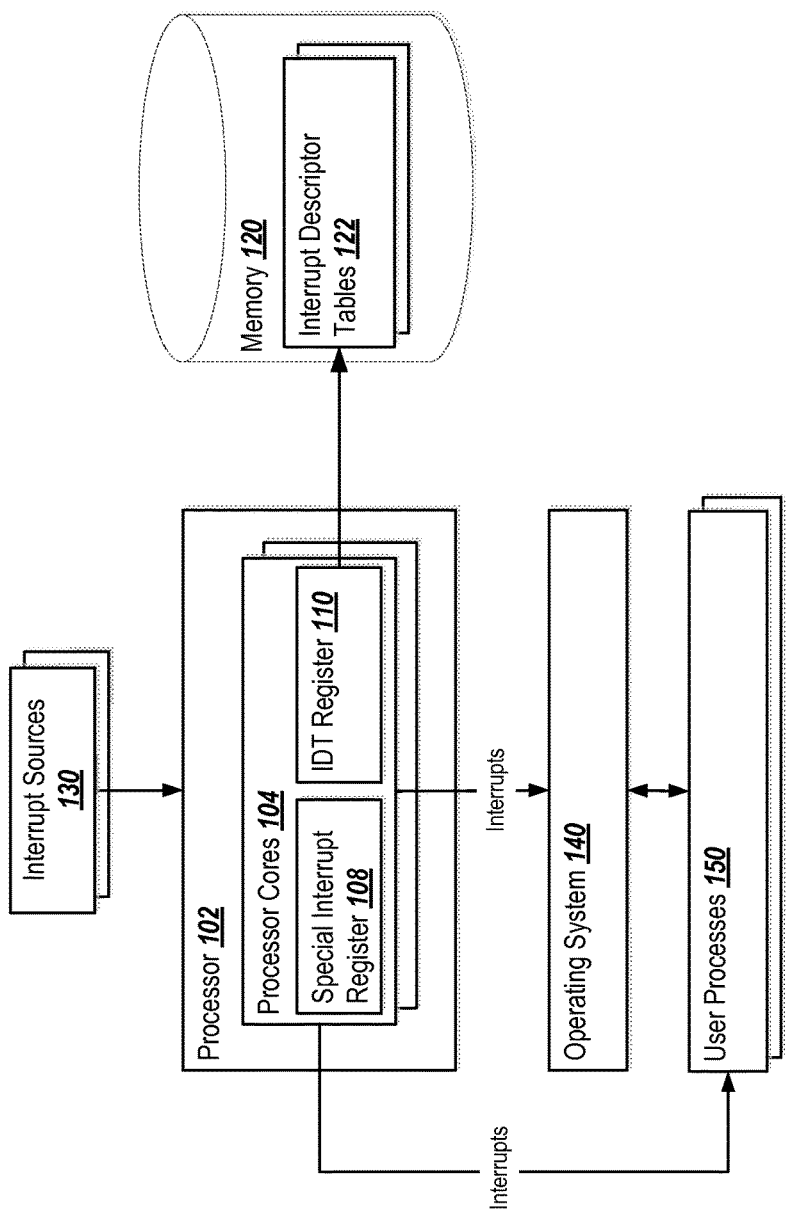
FIG. 1 is a block diagram of an environment in which user mode interrupts can be implemented.

FIG. 1 is a block diagram of an environment in which user mode interrupts are implemented. As shown, environment 100 includes a processor 102 including one or more processor cores 104. The processor 102 communicates with one or more interrupt sources 130, a memory 120, an operating system 140, and one or more user processes 150. Each of the processor cores 104 includes a special interrupt register 108, and an interrupt descriptor table (IDT) register 110. The interrupt descriptor table register 110 includes a location pointing to one of the one or more interrupt descriptor tables 122 stored in the memory 120.

In operation, the processor core 104 detects interrupts generated by the one or more interrupt sources 130. The processor core 104 may then associate the interrupt with a particular interrupt number. Processor core 104 may then consult the special interrupt register 108 to determine whether to translate the interrupt number into different interrupt number for delivery to one of the user processes 150. If such a translation is configured, the processor core 104 determines its current execution mode. If the current execution mode is a user mode, the interrupt number may be translated into a different interrupt number, and the interrupt may be delivered to one of the user processes 150 by consulting the interrupt descriptor table 122 to determine the address of an interrupt handler for the new interrupt number.

If the processor core 104 is currently executing in an operating system mode, the processor core 104 delivers the interrupt to the operating system 140 with the original interrupt number.

As shown, the environment 100 includes a processor 102. In some implementations, the processor 102 may be an x86 compatible processor, such as those manufactured by INTEL, AMD, or other manufacturers. The processor 102 may operate in different operating modes, including, but not limited to, real mode, virtual x86 mode, 16-bit mode, 32-bit mode, compatibility mode, long mode, and 64-bit mode. The processor 102 may also be another type of processor, including, but not limited to, ARM, QUALCOMM SNAPDRAGON, IBM POWER, XILINX MICROBLAZE, or other types of processors. In some implementations, the environment 100 may include two or more processors 102.

The processor 102 includes one or more processor cores 104. In some implementations, each of the processor cores 104 may be capable of executing one or more threads of execution. The processor cores 104 may execute these threads simultaneously with one another. In some implementations, the processor 102, the processor cores 104, or both components may include integrated storage for caching data. The processor 102 or the processor cores 104 may also include microcode including instructions defining the behavior of the components.

As shown, each of the processor cores 104 includes a special interrupt register 108. The special interrupt register 108 indicates to the processor core 104 whether an interrupt should be translated to a different interrupt number for presentation to a user process 150 while the processor core 104 is running in user mode. For example, the special interrupt register 108 may include an interrupt number to compare to a current interrupt to determine whether to translate the interrupt number. The special interrupt register 108 may also include an interrupt number to translate the interrupt to if the comparison is successful. In some implementations, each processor core 104 may include multiple special interrupt registers 108, such that the interrupt translation behavior may be performed for multiple interrupt numbers per hardware thread.

In some implementations, the special register 108 may include a pure instruction address, allowing the processor core 104 to fetch instructions directly without dependence on subsequent memory accesses. For example, in a 64-bit execution mode, the code segment base for processor core 104 may always be 0, so the pure instruction address is directly usable by the processor core 104. In non-64-bit modes, the code segment base may be forced to zero when the processor core 104 jumps to a user instruction. In some cases, the special register 108 is similar to a standard SYSCALL instruction, but entering into user mode.

In another example, the special register 108 may include a value including a special interrupt number and an interrupt handler address. Incoming interrupts may be checked against the special interrupt number. If an interrupt matches the special interrupt number, the interrupt is delivered to the interrupt handler address. In some implementations, the interrupt handler address in the special register 108 may be an address of an interrupt handler functions within a user process currently executing on the processor core 104. In some cases, the interrupt may be delivered to the interrupt handler address without performing the translation of the interrupt number, as the subsequent lookup into the interrupt descriptor table to retrieve the interrupt handler address is no longer necessary.

Each of the processor cores 104 also includes an interrupt descriptor table register 110. The interrupt descriptor table register 110 may include a memory address within the memory 120 at which a current interrupt descriptor table 122 may be found. In operation, the processor core 104 may consult this register to determine where in the memory its current interrupt descriptor table 122 is located. The processor core 104 may then read from the interrupt descriptor table 122 to determine how to process a particular interrupt. In some implementations, the operating system 140 may update the interrupt descriptor table register 110 to swap between different interrupt descriptor tables 122. In some cases, the operating system 140 does not update interrupt descriptor table register 110, and changing between interrupt descriptor table entries is performed by updating a page table base address register (e.g., CR3) to point to a page table that maps the interrupt descriptor table's virtual addresses to alternate physical addresses with differing interrupt descriptor table contents.

The environment 100 also includes a memory 120 or multiple memories 120. The memory 120 may include any type of memory or database module and may take the form of volatile and/or non-volatile memory including, without limitation, magnetic media, optical media, random access memory (RAM), read-only memory (ROM), removable media, or any other suitable local or remote memory component. The memory 120 may also include cache memory integrated into the processor 102 or the processor cores 104.

The memory 120 includes one or more interrupt descriptor tables 122. In some implementations, the interrupt descriptor tables 122 include mappings from interrupt numbers to interrupt handler functions. The interrupt handler functions may be stored as memory addresses within the table. When an interrupt associated with particular interrupt number is received, the processor core 104 may consult the interrupt descriptor table 122 to determine the address of the appropriate interrupt handler to call to handle the interrupt. In some cases, a single interrupt descriptor table 122 is used and a single pointer is multiplexed for the user-gate interrupt selection on a context switch.

As shown, the environment also includes one or more interrupt sources 130. The interrupt sources 130 may be hardware or software devices that communicate with the processor 102 by sending indications that certain events have occurred in the form of interrupts. In some implementations, the interrupt sources 130 may include flash storage devices, solid-state drives (SSDs), Network Interface Cards (NICs), Random Access Memory (RAM), or other devices. In some implementations, the interrupt sources 130 may communicate with the processor via a data transmission link, such as, for example a bus, a bridge, or another type of link.

The environment 100 also includes an operating system 140. In some implementations, the operating system 140 may be a commercial or open source operating system executing on the processor 102. In some implementations, the operating system may be GOOGLE ANDROID, GOOGLE CHROMEOS, or other operating systems. In operation, the operating system 140 may receive interrupts from the one or more processor cores 104 at an entry point defined in the interrupt descriptor table 122. For example, the processor core 104 may call an interrupt handler function within the operating system 140 at a memory address stored in the interrupt descriptor table 122 in response to receiving a particular interrupt while the processor core 104 is in an operating system mode.

The environment 100 also includes one or more user processes 150. The user processes 150 may be user mode programs executing on the one or more processor cores 104 at the direction of the operating system 140. In some implementations, the user processes 150 may include multiple threads of execution executing on the processor cores 104. The user processes 150 may receive interrupts from the processor cores 104 at entry points defined within the interrupt descriptor tables 122. For example, the processor core 104 may receive a particular interrupt while executing a user process 150 in user mode. Processor core 104 may translate the interrupt to a different interrupt number and may consult the interrupt descriptor table 122 for the address of an interrupt handler function associated with the new interrupt number. The processor core 104 may then call the interrupt handler at this memory location to deliver the interrupt to the user process 150.

In some implementations, the translation between interrupt numbers may be performed by a virtual machine architecture, either instead of or in cooperation with the processor cores 104.

Figure 2:
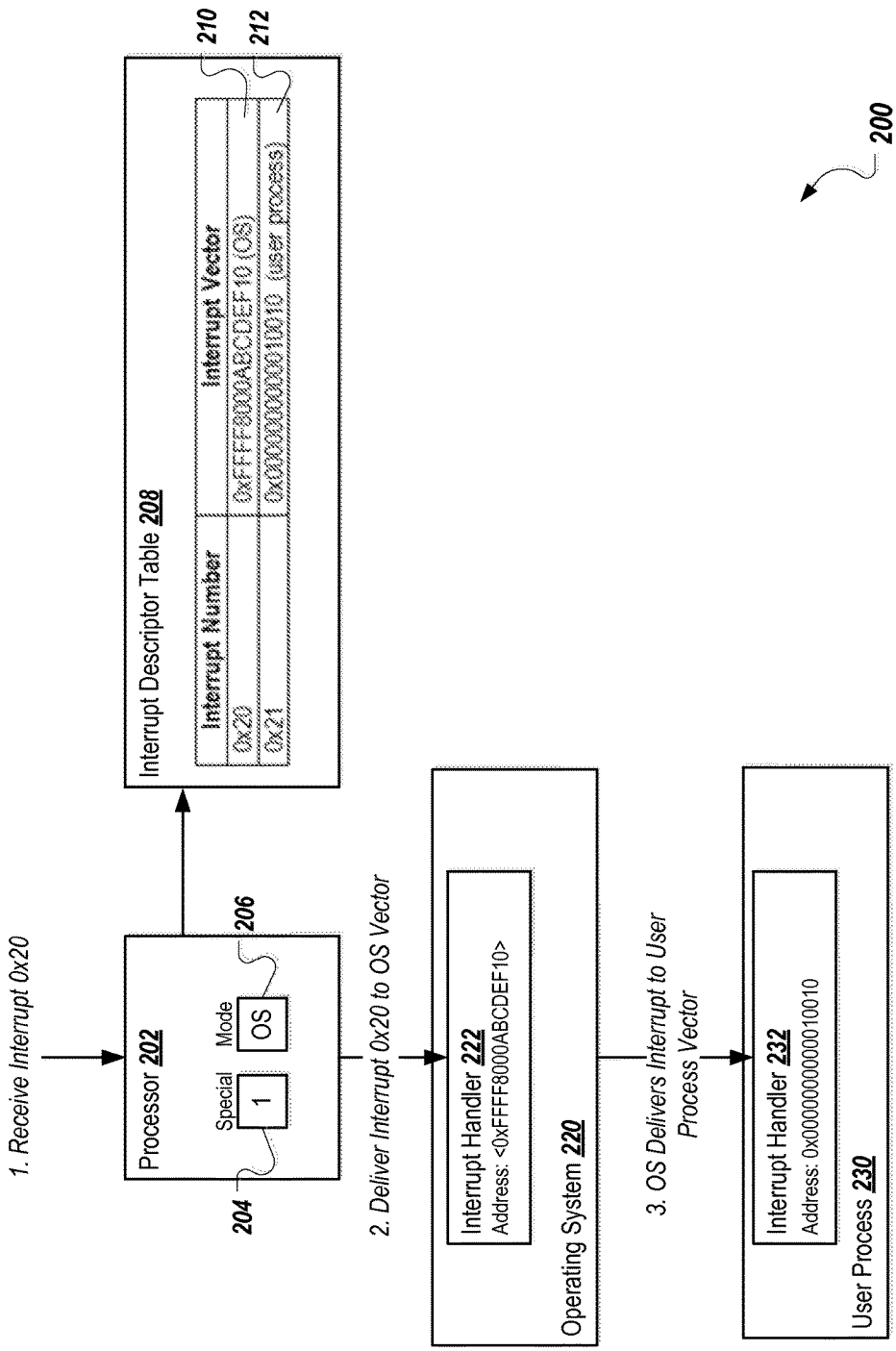
FIG. 2 is a diagram of an example interaction showing an interrupt being delivered to an operating system when a processor is in operating system (OS) mode.

FIG. 2 is a diagram of an example interaction showing an interrupt being delivered to an operating system when a processor is in operating system (OS) mode. As shown, the processor 202 receives interrupt 0x20. In some implementations, the processor 202 is the same as the processor 102 described relative FIG. 1. The processor 202 may receive the interrupt from an interrupt source, such as the interrupt sources 130 described relative FIG. 1. The processor 202 includes a special interrupt register 204 set to a value of one, and an execution mode indicator 206 set to a value of "OS," indicating that the processor 202 is executing in operating system mode.

The processor 202 consults an interrupt descriptor table 208 to determine how to handle the received interrupt. Because the processor 202 is currently executing in operating system mode, the processor 202 does not translate the interrupt number, and reads the address of the interrupt handler associated with interrupt number 0x20 from the interrupt descriptor table 208 at row 210. The processor 202 then delivers the interrupt to operating system 220 by calling interrupt handler 222. As shown, the interrupt handler 222 is located at the address stored in the interrupt descriptor table 208 at row 210. After receiving the interrupt, the operating system 220 delivers the interrupt to user process 230 by calling interrupt handler 232.

Figure 3:
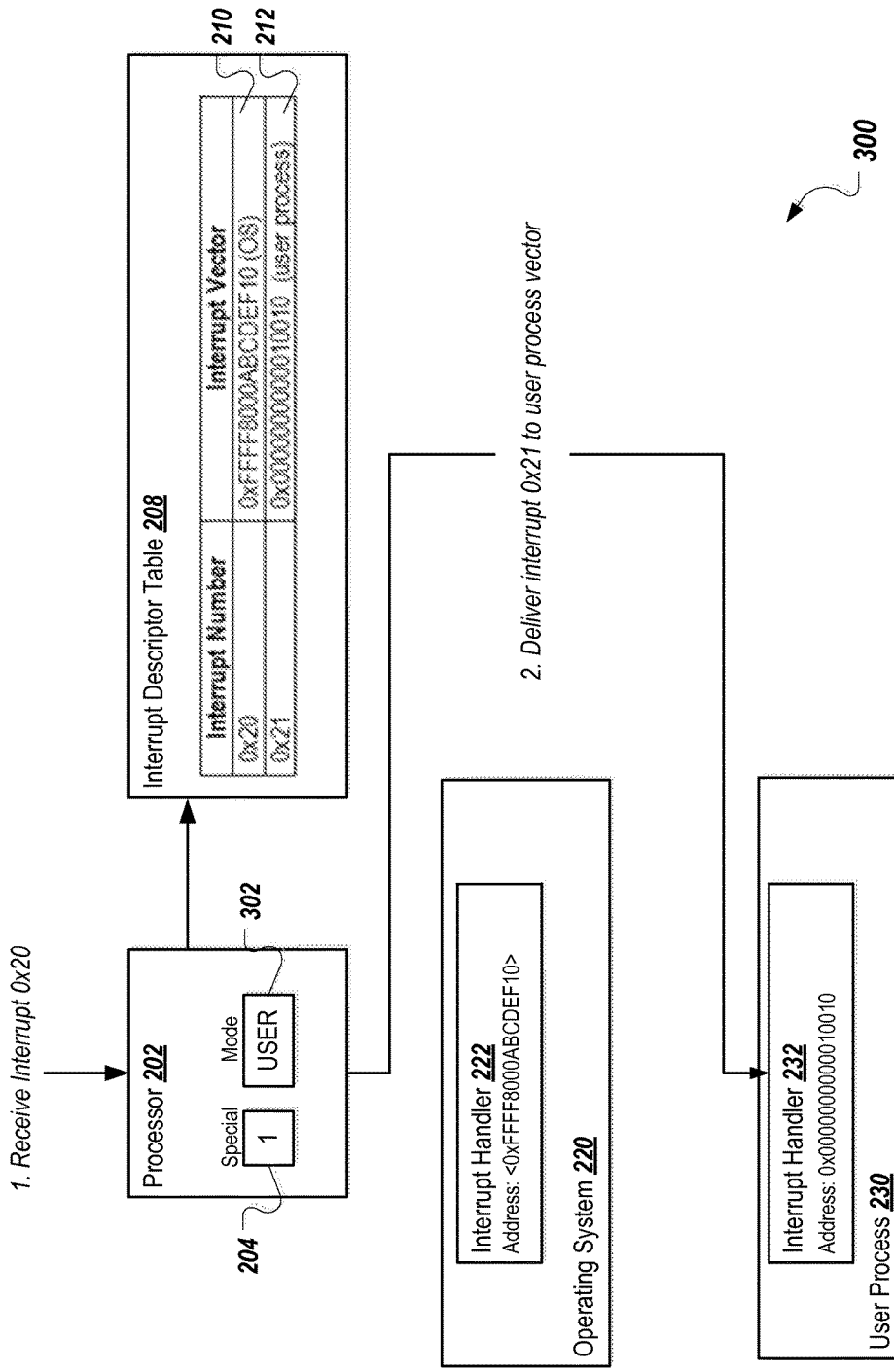
FIG. 3 is a diagram of an example interaction showing an interrupt being translated and delivered to a user process when a processor is in user mode.

FIG. 3 is a diagram of an example interaction showing an interrupt being translated and delivered to a user process when a processor is in user mode. As shown, the processor 202 receives interrupt 0x20. The special register 204 includes a value of one, indicating that interrupt translation is enabled. The execution mode indicator 302 now indicates that the processor 202 is executing in user mode. Accordingly, the processor 202 performs a translation on interrupt 0x20, in this case translating the interrupt 0x20 to interrupt 0x21.The processor 202 reads the address for the interrupt handler corresponding to interrupt 0x21from row 212 of the interrupt descriptor table 208. The processor 202 then delivers the translated interrupt 0x21 to user process 230 by calling interrupt handler 232. The interrupt handler 232 is located at the address stored in the interrupt descriptor table for interrupt number 0x21.

Figure 4:
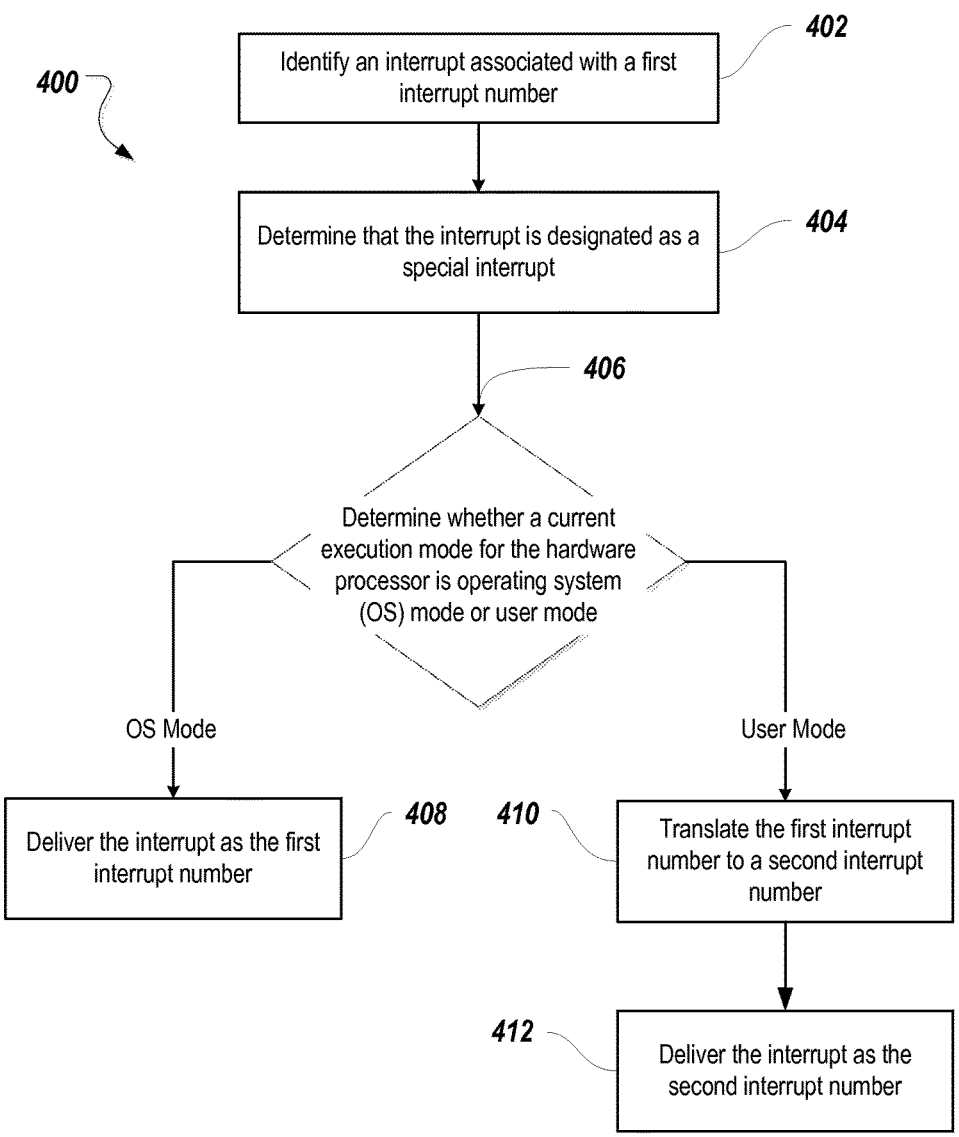
FIG. 4 is a flow diagram of an example process for providing user mode interrupts.

FIG. 4 is a flow diagram of an example process for providing user mode interrupts. At 402, an interrupt associated with the first interrupt number is identified. At 404, a determination is made that the interrupt is designated as a special interrupt. In some implementations, determining that the interrupt is designated as a special interrupt includes examining a register indicating that the interrupt is designated as a special interrupt. In some cases, a special interrupt being an interrupt to be translated to a different interrupt number if the hardware processor is in user mode.

At 406, a determination is made whether a current execution mode for the hardware processor is an operating system mode or a user mode. If the current execution mode is operating system mode, the interrupt is delivered as the first interrupt number (408). In some implementations, the interrupt is delivered to an operating system executing on the hardware processor.

If the current execution mode is user mode, the method 400 continues to 410, where the first interrupt number is translated to a second interrupt number. At 412, the interrupt is delivered as a second interrupt number. In some implementations, the interrupt is delivered to a user process executing on the hardware processor. The interrupt may be delivered to an interrupt vector associated with the second interrupt number in an interrupt descriptor table (IDT) entry associated with the user process. In some cases, delivering the interrupt to the user process does not include delivering the interrupt to the operating system.

In some cases, the method 400 includes performing a context switch from the first user process to a second user process different than the first user process, and identifying a second IDT entry associated with the second user process upon performing the context switch. The method 400 may also include identifying a second interrupt associated with the first interrupt number after performing the context switch, and delivering the interrupt to a second interrupt vector associated with the second interrupt number in the second IDT entry associated with the second user process. In some cases, performing the context switch does not include updating an IDT base register.

In some implementations, an interrupt gate may be used to specify the instruction address of the interrupt handler, and the desired mode (OS or user) in which the interrupt handler should be run. In some cases, the IDT may be placed in a page within memory that is mapped to different memory contents for each user process. In such a case, switching the page table base register (e.g., CR3) causes an IDT change implicitly with the page table change, with no additional processor state change. In some implementations, the operating system may be responsible for migrating the interrupt from core to core, for example by using VT-d interrupt remapping or MSI(-x) vector rewriting.

In some implementations, the OS will set Eflags.IOPL to 0 for the interrupt descriptor table entry, which causes Eflags.IF to not be cleared when the interrupt is delivered to user mode. This prevents the user from masking hardware interrupts. The device itself may self-mask interrupts such that it does not deliver interrupts at an excessive rate. More generally, the system is configured to allow interrupts to be delivered to the user code without masking other interrupts.

The operating system may disable the special interrupt mechanism when switching to another thread, which may have its own special interrupt number assigned.

In some implementations, the method 400 includes processing additional interrupts without waiting for an End of Interrupt (EOI) indication from the user process after delivering the interrupt as the second interrupt number. In such a case, the step of setting the Interrupt Sent Register (ISR) bit with an Advanced Programmable Interrupt Controller (APIC) may be skipped, obviating the need for an explicit EOI indication from the user process. In some cases, the APIC may include a configuration bit vector enabling or disabling this behavior for each interrupt.

The method 400 may also include receiving an End of Interrupt (EOI) indication from the user process indicating that the user process has finished processing the interrupt after delivering the interrupt as the second interrupt number. In some implementation, an APIC may include a special EOI instruction accessible by the user process. In some cases, the processor may generate an EOI for the user process to the APIC as part of delivering the interrupt. Such a case may eliminate the need for a design change to the processor or APIC and may be implemented in microcode.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a transmission link for receipt by the second device, but may not include the second device receiving the data. Conversely, "receiving" from a first device may include receiving the data from a transmission link, but may not include the first device transmitting the data.

"Determining" by a computing system can include the computing system requesting that another device perform the determination and supply the results to the computing system.

Embodiments of the subject matter and the operations described in this specification can be implemented in digital electronic circuitry, or in computer software, firmware, or hardware, including the structures disclosed in this specification and their structural equivalents, or in combinations of one or more of them.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and optical disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by a hardware processor, the method comprising:
processing interrupts, and for each interrupt:
identifying an interrupt associated with a first interrupt number;
determining that the interrupt is designated as a special interrupt, the special interrupt being an interrupt to be translated to a different interrupt number only if the hardware processor is in user mode;
determining a current execution mode for the hardware processor;
for each interrupt for which the current execution mode is determined to be an operating system mode, delivering the interrupt as the first interrupt number; and
for each interrupt for which the current execution mode is determined to be a user mode:
translating the first interrupt number to a second interrupt number; and
delivering the interrupt as the second interrupt number,
wherein the current execution mode is determined to be an operating system mode for at least one of the interrupts, and the current execution mode is determined to be a user mode for at least an additional one of the interrupts.

2. The method of claim 1, wherein determining that the interrupt is designated as a special interrupt includes examining a register indicating that the interrupt is designated as a special interrupt.

3. The method of claim 2, wherein the register includes a special interrupt number and an interrupt handler address, determining that the interrupt is designated as a special interrupt includes comparing the first interrupt number to the special interrupt number, and delivering the interrupt as the second interrupt number includes delivering the interrupt to the interrupt handler address.

4. The method of claim 1, wherein delivering the interrupt as the first interrupt number upon determining that the current execution mode is an operating system mode includes delivering the interrupt to an operating system executing on the hardware processor.

5. The method of claim 1, wherein delivering the interrupt as the second interrupt number upon determining that the current execution mode is a user mode includes delivering the interrupt to a user process executing on the hardware processor.

6. The method of claim 5, wherein the current execution mode is determined to be a user mode for a first interrupt of the processed interrupts, and the method further comprises processing additional interrupts without waiting for an End of Interrupt (EOI) indication from the user process after delivering the first interrupt as the second interrupt number.

7. The method of claim 5, wherein the current execution mode is determined to be a user mode for a first interrupt of the processed interrupts, and the method further comprises:
generating an End of Interrupt (EOI) indication after delivering the first interrupt to the user process; and
sending the EOI indication to an interrupt controller.

8. The method of claim 5, wherein the current execution mode is determined to be a user mode for a first interrupt of the processed interrupts, and the method further comprises receiving an End of Interrupt (EOI) indication from the user process indicating that the user process has finished processing the first interrupt after delivering the first interrupt as the second interrupt number.

9. The method of claim 5, wherein the delivering the interrupt as the second interrupt number including delivering the interrupt to an interrupt vector associated with the second interrupt number in an interrupt descriptor table (IDT) entry associated with the user process.

10. The method of claim 9, wherein the IDT entry is a first IDT entry and the user process is a first user process, and the method further comprises:
performing a context switch from the first user process to a second user process different than the first user process; and
identifying a second IDT entry associated with the second user process upon performing the context switch.

11. The method of claim 10, wherein the interrupt is a first interrupt, the interrupt vector is a first interrupt vector, and the method further comprises:
identifying a second interrupt associated with the first interrupt number after performing the context switch; and
delivering the second interrupt to a second interrupt vector associated with the second interrupt number in the second IDT entry associated with the second user process.

12. The method of claim 10, wherein performing the context switch includes updating a page table base register and identifying the second IDT entry is performed based at least in part on the updated page table base register.

13. The method of claim 9, wherein the interrupt is a first interrupt, the interrupt vector is a first interrupt vector, the IDT entry is a first IDT entry, and the user process is a first user process, and the method further comprises:
performing a context switch from the first user process to a second user process different than the first user process, wherein performing the context switch includes updating the first IDT entry to include a second interrupt vector associated with the second user process;
identifying a second interrupt associated with the first interrupt number after performing the context switch; and delivering the second interrupt to the second interrupt vector associated with the second interrupt number in the first IDT entry.

14. The method of claim 5, wherein delivering the interrupt to the user process executing on the hardware processor does not include delivering the interrupt to the operating system.

15. A non-transitory, computer-readable medium storing instructions operable when executed to cause at least one hardware processor to perform operations comprising:
processing interrupts, and for each interrupt:
identifying an interrupt associated with a first interrupt number;
determining that the interrupt is designated as a special interrupt, the special interrupt being an interrupt to be translated to a different interrupt number only if the hardware processor is in user mode;

determining a current execution mode for the hardware processor;

for each interrupt for which the current execution mode is determined to be an operating system mode, delivering the interrupt as the first interrupt number; and for each interrupt for which the current execution mode is determined to be a user mode:

translating the first interrupt number to a second interrupt number; and delivering the interrupt as the second interrupt number, wherein the current execution mode is determined to be an operating system mode for at least one of the interrupts, and the current execution mode is determined to be a user mode for at least an additional one of the interrupts.

16. The non-transitory, computer-readable medium of claim 15, wherein determining that the interrupt is designated as a special interrupt includes examining a register indicating that the interrupt is designated as a special interrupt.

17. The non-transitory, computer-readable medium of claim 16, wherein the register includes a special interrupt number and an interrupt handler address, determining that the interrupt is designated as a special interrupt includes comparing the first interrupt number to the special interrupt number, and delivering the interrupt as the second interrupt number includes delivering the interrupt to the interrupt handler address.

18. The non-transitory, computer-readable medium of claim 15, wherein delivering the interrupt as the second interrupt number upon determining that the current execution mode is a user mode includes delivering the interrupt to a user process executing on the hardware processor.

19. The non-transitory, computer-readable medium of claim 18, wherein the current execution mode is determined to be a user mode for a first interrupt of the processed interrupts, and the operations further comprise processing additional interrupts without waiting for an End of Interrupt (EOI) indication from the user process after delivering the first interrupt as the second interrupt number.

20. A system comprising:

memory for storing data; and a hardware processor operable to perform operations comprising:

processing interrupts, and for each interrupt:

identifying an interrupt associated with a first interrupt number;

determining that the interrupt is designated as a special interrupt, the special interrupt being an interrupt to be translated to a different interrupt number only if the hardware processor is in user mode;

determining a current execution mode for the hardware processor;

for each interrupt for which the current execution mode is determined to be an operating system mode, delivering the interrupt as the first interrupt number; and for each interrupt for which the current execution mode is determined to be a user mode:

translating the first interrupt number to a second interrupt number; and delivering the interrupt as the second interrupt number, wherein the current execution mode is determined to be an operating system mode for at least one of the interrupts, and the current execution mode is determined to be a user mode for at least an additional one of the interrupts.

* * * * *